United States Patent
Rommelmann et al.

(10) Patent No.: US 7,197,633 B2
(45) Date of Patent: *Mar. 27, 2007

(54) WIRELESS MACHINE POST-LAUNCH CONFIGURATION AND OPTION UPGRADE

(75) Inventors: Heiko Rommelmann, Penfield, NY (US); Robert A. Koontz, Webster, NY (US); Christian Redder, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 549 days.

This patent is subject to a terminal disclaimer.

(21) Appl. No.: 10/630,048

(22) Filed: Jul. 30, 2003

(65) Prior Publication Data

US 2005/0028100 A1 Feb. 3, 2005

(51) Int. Cl.
*G06F 15/177* (2006.01)
(52) U.S. Cl. .................. 713/1; 713/1; 713/2; 713/100; 399/12; 399/25; 399/108; 399/109
(58) Field of Classification Search ............ 399/8, 399/12, 24, 111
See application file for complete search history.

(56) References Cited

U.S. PATENT DOCUMENTS

| | | | |
|---|---|---|---|
| 4,496,237 A | 1/1985 | Schron | 355/14 C |
| 4,961,088 A | 10/1990 | Gilliland et al. | 355/206 |
| 6,088,450 A | 7/2000 | Davis et al. | |
| 6,351,621 B1 | 2/2002 | Richards et al. | 399/111 |
| 6,532,351 B2* | 3/2003 | Richards et al. | 399/111 |
| 6,563,600 B1 | 5/2003 | Young | 358/1.5 |
| 6,735,399 B2* | 5/2004 | Tabb et al. | 399/8 |
| 6,865,349 B2* | 3/2005 | Silence et al. | 399/8 |
| 2004/0240904 A1* | 12/2004 | Koontz et al. | 399/75 |
| 2005/0036794 A1* | 2/2005 | Koontz et al. | 399/12 |

FOREIGN PATENT DOCUMENTS

EP 0 957 461 A1 11/1999

OTHER PUBLICATIONS

Robert A. Koontz et al., entitled "Machine Post-Launch Configuration and Option Upgrade", U.S. Appl. No. 10/447/737, filed May 29, 2003 (D/A3028).

(Continued)

*Primary Examiner*—A. Elamin
*Assistant Examiner*—Nitin C. Patel
(74) *Attorney, Agent, or Firm*—Christopher D. Wait

(57) ABSTRACT

By providing a secure EEPROM (Electrically Erasable Programmable Read Only Memory) device or other non-volatile memory (NVM) with a wireless interface as a system operation key (SOK) to control the configurable machine option attributes, various problems associated with machine option configuration and updates may be accommodated. At initial SOK install the identity of the machine is written to the NVM, i.e. the machine serial number. This is performed during the initial machine power up or reboot sequence. As part of the power on or reboot routine the machine will check via the wireless interface to ensure no tampering has taken place and that the machine identity and the NVM serial number location data match. A new swapped in SOK can be installed so long as the NVM serial number location has not been previously written to with a conflicting identification number. The machine will then write the serial number to the new SOK thereby protecting it.

19 Claims, 5 Drawing Sheets

OTHER PUBLICATIONS

Robert A. Koontz et al., entitled "Machine Post-Launch Configuration and Option Upgrade With Master Key", U.S. Appl. No. 10/447,737, filed simultaneously herewith (D/A3245).

Thomson Multimedia: "SmartRight Contribution to Rights Management & Protection Specifications", May 22, 2002, XP002310904.

* cited by examiner

WIRELESS MACHINE POST-LAUNCH CONFIGURATION AND OPTION UPGRADE

RELATED CASES

Cross reference is made to the following related applications incorporated by reference herein: U.S. patent application Ser. No. 10/447,737 entitled "MACHINE POST-LAUNCH CONFIGURATION AND OPTION UPGRADE" to Robert A. Koontz, Christian Redder, Heiko Rommelmann, David S. Shuman, and Christian G. Midgley; U.S. patent application Ser. No. 10/630,076 entitled "MACHINE POST-LAUNCH CONFIGURATION AND OPTION UPGRADE WITH MASTER KEY" to Robert A. Koontz, James A. Long, and Heiko Rommelmann.

BACKGROUND

The present invention relates generally to the updating of machine options. The invention relates more importantly to the upgrade of printer and copier machine option features and capabilities. The invention relates in particular with regards to a machine controller, wireless controller support memory units, and wireless enabling keys.

In the office-equipment market, such as for printers and copiers, a common business model is to manufacture a single base "platform" in hardware, and then use the software controls over the hardware to provide a set of distinctly different products. In an office multi-function product this may include both software controlled operational upgrades as well as software controlled hardware upgrades. For instance, with reference to digital xerographic "laser printers," a basic hardware platform capable of outputting 40 pages per minute (ppm) can be slowed down to output pages at 30 ppm or even 20 ppm, purely by altering the control software which operates the identical hardware. Typical techniques for slowing down a basic hardware platform include simply running the various electric motors at slower speeds, or deliberately skipping an operational cycle (not feeding a print sheet, and withholding image data) for one or more of a given number of hardware cycles. The advantages of this business model include the desirability of selling different speed-rated machines at different prices to meet market demands, and also the ability to speed up a sloweddown machine (such as by loading in new software) should an existing customer decide he wants a faster machine. Also, in a re-manufacturing environment, it is useful to be able to minimize the number of hardware configurations that must be processed.

Machines sold, installed, and serviced will typically require either customer interaction or service representative intervention to enable some or all of the possible software and hardware features. This may be carried out either by a service representative at the time of install or on a subsequent service call. In the latter case it usually requires some sort of password and enablement key. This is typically obtained by the service representative and is then entered into the machine via a GUI or some service tool. Alternatively, customers are required to interact with the manufacturer either over the phone or through the web to get the desired options enabled. As a consequence for either of the above scenarios, there is a burden on the manufacturer's support infrastructure to obtain needed information from the customer and ensure that the customer receives all they are entitled to. Further, the system may also be vulnerable to failure if the machine requires a replacement or upgrade of software and the settings are not carefully kept track of. All of these requirements are complex and add a significant cost to doing business. A further technical challenge in providing office equipment centered upon a single basic hardware platform that may be configured with multiple options, is to provide some security that the option set of a particular machine (such as at a customer site) will not be altered, such as being sped up, in an unauthorized or improper manner.

In U.S. Pat. No. 6,563,600 to Young, the invention described discloses a basic hardware platform of a copier or printer that is selectably enabled to operate at different speeds, such as 40 ppm or 30 ppm, by a combination of entering a password into non-volatile memory within the machine, and also altering a state of a hardware switch within the machine.

In U.S. Pat. No. 4,496,237 to Schron, the invention described discloses a reproduction machine having a non-volatile memory for storing indications of machine consumable usage such as photoreceptor, exposure lamp and developer, and an alphanumeric display for displaying indications of such usage. In operation, a menu of categories of machine components is first scrolled on the alphanumeric display. Scrolling is provided by repetitive actuation of a scrolling switch. Having selected a desired category of components to be monitored by appropriate keyboard entry, the sub-components of the selected category can be scrolled on the display. In this manner, the status of various consumables can be monitored and appropriate instructions displayed for replacement. In another feature, the same information on the alphanumeric display can be remotely transmitted.

In U.S. Pat. No. 4,961,088 to Gilliland et al., there is disclosed a monitor/warranty system for electrostatographic reproducing machines in which replaceable cartridges providing a predetermined number of images are used, each cartridge having an EEPROM programmed with a cartridge identification number that when matched with a cartridge identification number in the machine enables machine operation, a cartridge replacement warning count, and a termination count at which the cartridge is disabled from further use, the EEPROM storing updated counts of the remaining number of images left on the cartridge after each print run.

U.S. Pat. No. 6,351,621 to Richards et al., discloses that in a printer or copier, a removable module, such as a marking material supply module or a marking device module, is provided with a non-volatile memory chip which retains information about the cumulative use of the module and other performance-related data. The non-volatile memory is accessed through a wireless interface, such as an RF loop or IR detector, which is also associated with the module. The memory can be accessed, through wireless means, either by the printer or copier itself or by an external device. The wireless interface can also be used to access a memory which is attached to part which moves within the printer or copier, such as a roller or drum, thus avoiding the use of wire harnesses.

All of the patents indicated above are herein incorporated by reference in their entirety for their teaching.

Therefore, as discussed above, there exists a need for an arrangement and methodology which will solve the problem of providing system option updates and reconfiguration without the need for a field service call. Thus, it would be desirable to solve this and other deficiencies and disadvantages as discussed above with an improved methodology for updating machine options.

The present invention relates to a method for managing machine operation options and configuration. The method comprises providing a software operation key separable from the machine, the software operation key further comprising a wireless interface, a memory, the memory further comprising a programmable serial region and an option code. The method further comprises placing the software operation key into the machine, reading via the wireless interface the programmable serial region of the memory and if found blank, initializing with a machine identification number, comparing the content of the programmable serial region if not blank with the machine identification number and reading the memory via the wireless interface and placing the option code into the machine. The method finally comprises operating the machine in accordance with the option code.

The present invention relates to a printing machine comprising a software operations key separable from the machine. The software operations key further comprising a wireless interface and a memory, with the memory having at least an option code region, and a one time programmable serial region. The printing machine also comprises an option code written into the option code region of the memory suitable for directing the printing machine to operate in a particular configuration, and a control system to access the one time programmable serial region of the memory via the wireless interface and determine thereby if the option code in the option code region of the software operations key should be used to configure the printing machine.

In particular, the present invention relates to a software operations key for setting the option configuration of a machine which is separable from that machine. The software operations key comprising a wireless interface, and a memory. The memory having at least an option code region, and a one time programmable serial region. The software operations key further comprising an option code written into the option code region of the memory suitable when accessed via the wireless interface, for directing the machine to operate in a particular configuration.

DESCRIPTION

By providing a secure EEPROM (Electrically Erasable Programmable Read Only Memory) device or other non-volatile memory (NVM) as a system operation key (SOK) to control the configurable machine option attributes, various problems associated with machine option configuration and updates may be accommodated. Examples of these options may include but are not limited to: device/machine speed; machine stand alone mode, or network connected mode, market segment configuration, scanning enabled; scan to email; scan to Internet Fax; network server Fax enabled; job based accounting; hard disk overwrite; immediate job overwrite; etc. At initial SOK install the identity of the machine is written to the NVM, i.e. the machine serial number. This is performed during initial machine power up or reboot sequence. As part of the power on or reboot routine the machine will check to ensure no tampering has taken place and that the machine identity and the NVM serial number location data match. Alternatively, to add or remove features or change the machine configuration, a new swapped in SOK can be installed so long as the NVM serial number location has not been previously written to with a conflicting identification number. The machine would then write the serial number to the new SOK, thereby protecting it. Each SOK can enable different options, which will allow different machines to be configured however they need to be. A customer can add options at a later time by receiving a SOK that would enable the desired additional feature or features, and installing it into the machine. The number of SOKs that can be installed is limited by the number of interface sockets provided on the machine. Further, by providing a wireless enabled SOK, several customer deployment logistics may be greatly ameliorated, much to the betterment of any ultimate customer satisfaction.

While the present invention will hereinafter be described inclusive of a preferred embodiment example thereof, it will be understood that it is not intended to limit the invention to that embodiment. On the contrary, it is intended to cover all alternatives, modifications and equivalents as may be included within the spirit and scope of the invention as defined by the appended claims.

Figure 1:
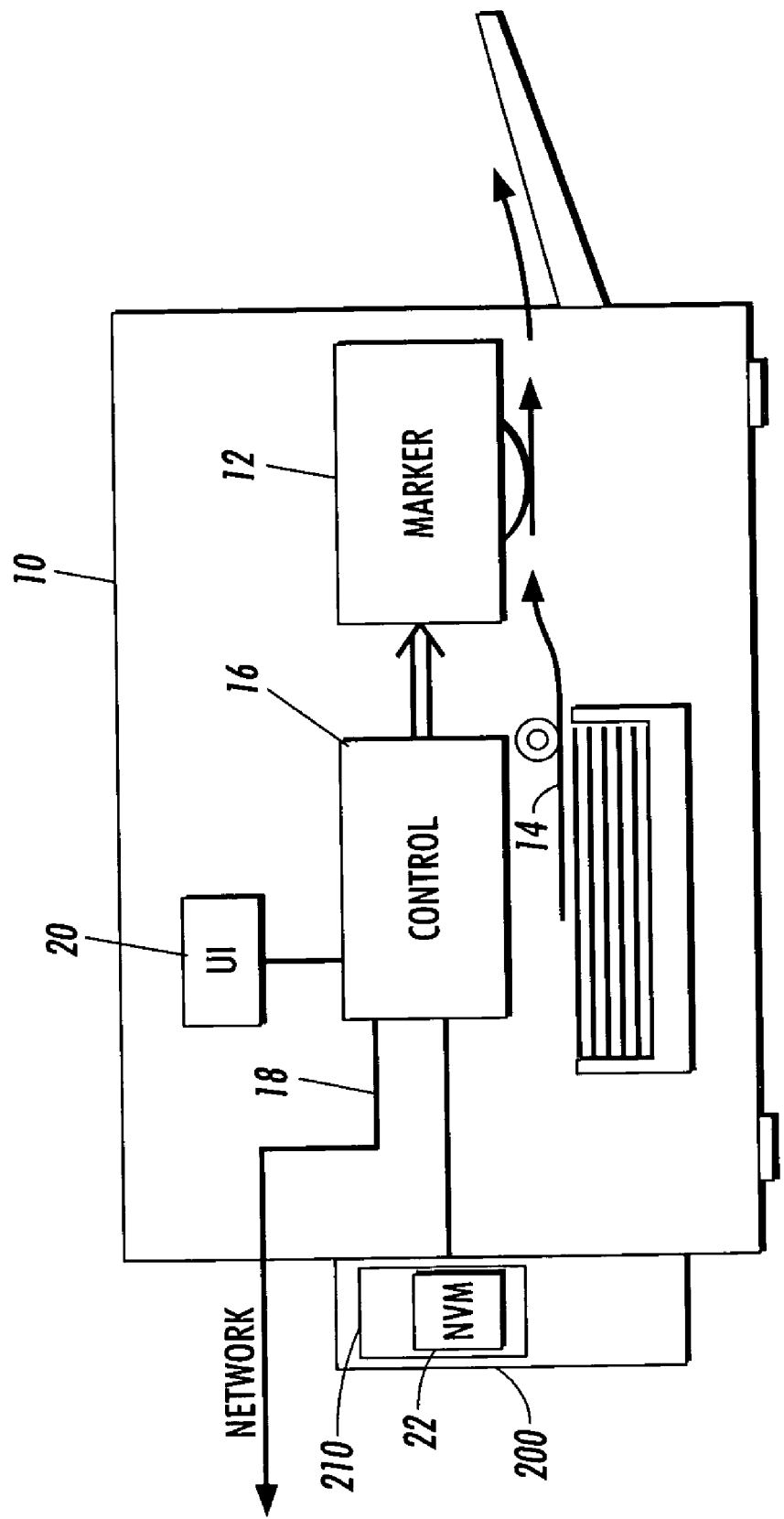
FIG. 1 is a simplified systems diagram showing essential elements of a digital printing apparatus or multi-function device relative to the present invention.

FIG. 1 is a simplified systems diagram showing essential elements of office equipment, such as a digital ink-jet or "laser" printer, relevant to the present invention. The printer 10 (which, for purposes of the claims below, could be a device such as a fax machine; digital or light-lens copier; or part of a multifunction office device) includes what is here called a marker 12, which should generally be considered the set of hardware which operates to place marks on a sheet. As such, the marker 12 could include a xerographic engine, an ink-jet printhead, thermal printer elements, etc. Print sheets drawn from a stack 14 are caused to move through or past marker 12 to receive marks thereon representing an image desired to be printed.

The basic hardware forming marker 12 is in turn controlled by software, which is embodied by a control system generally indicated as 16. As is well known in the art of office equipment, the control 16 includes any number of data-processing hardware circuits combined with suitable software for controlling the marker so as to output desired images. The control 16 can thus include a raster image processor, a facsimile capability, or even means for operating the light-lens hardware in a copier. Also as shown, control 16 can interact with a network connection 18, through which can be received not only image data but control data instructing the printer 10 to operate in a particular manner.

With particular relevance to the present invention, also associated with control 16 are a user interface UI 20, and bustle 200 with a SOK 210 comprising non-volatile memory (NVM) 22. The SOK 210 may be one of any number of memories associated with bustle 200 and control 16, but the significance of the particular SOK 210 and NVM 22 in the invention is that it should include thereon, at a predetermined location in memory that can be found by control 16, specific code data as will be described in detail below. What is important is that, in the course of the operation of machine 10, the control 16 at one point or another reads a certain amount of code data from NVM 22, and based on what is read in the NVM 22, determines in one embodiment whether to operate marker 12 at one selected speed or another speed.

Figure 2:
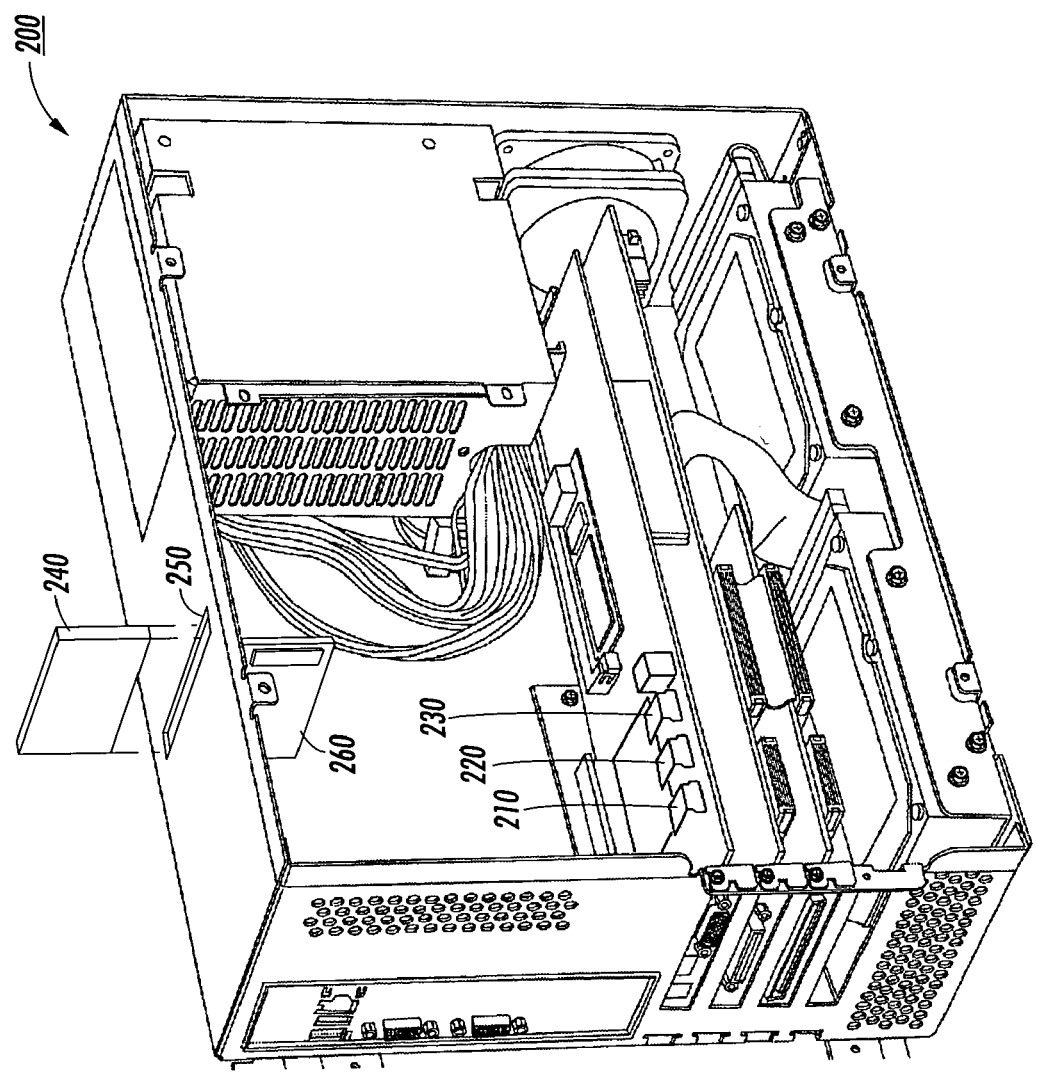
FIG. 2 further depicts the machine bustle shown in FIG. 1.

In FIG. 2 there is depicted a perspective view of the bustle 200. Located within bustle 200 is SOK 210. The bustle may also include the controller 16 as well as a power supply or any number of other circuit blocks. In one embodiment within the contemplation of this invention there is but one SOK. However, in this alternative embodiment as depicted here in FIG. 2, there is allowance for as many as four SOKs: possible SOK 210, possible SOK 220, possible SOK 230, and possible wireless SOK 240. Wireless SOK 240 is slipped into bustle 200 via a slot 250 so as to be in sufficiently close placement with wireless transceiver card 260. A multiplicity of SOKs allows for a greater number of possible options to be configured. In this embodiment there is no requirement that any SOK be present since the machine will simply default to some base configuration in the absence of a SOK. An alternative embodiment may require at least one SOK to be present.

SOK 210 is comprised of NVM 22. A SOK may be comprised of additional elements besides memory as for example a power supply, off board drivers, socket hardware, level shifting circuits, interface hardware or as described below wireless communication circuits. In the present example SOK 210 is comprised solely of NVM 22. In one contemplated alternative SOK 22 is embodied as a CRUM (Customer Replaceable Unit Monitor). Here NVM 22 provided for in the form of an EEPROM (Electrically Erasable Programmable Read Only Memory). The memory 22 is preferably of a non-volatile type of memory such as the EEPROM just mentioned above. However, it will be well understood that there are many different ways to effect non-volatile memory and all those ways are within the contemplation of the present invention. For example, conventional ROM (Read Only Memory) is typically volatile and will lose the data contents of its cells when power is removed. However, if ROM is provided in combination with a long life battery on the SOK and if the ROM is of sufficiently low power dissipation, the combination may for all practical purposes effect a non-volatile memory as far as the useful life of the SOK is concerned.

Figure 3:
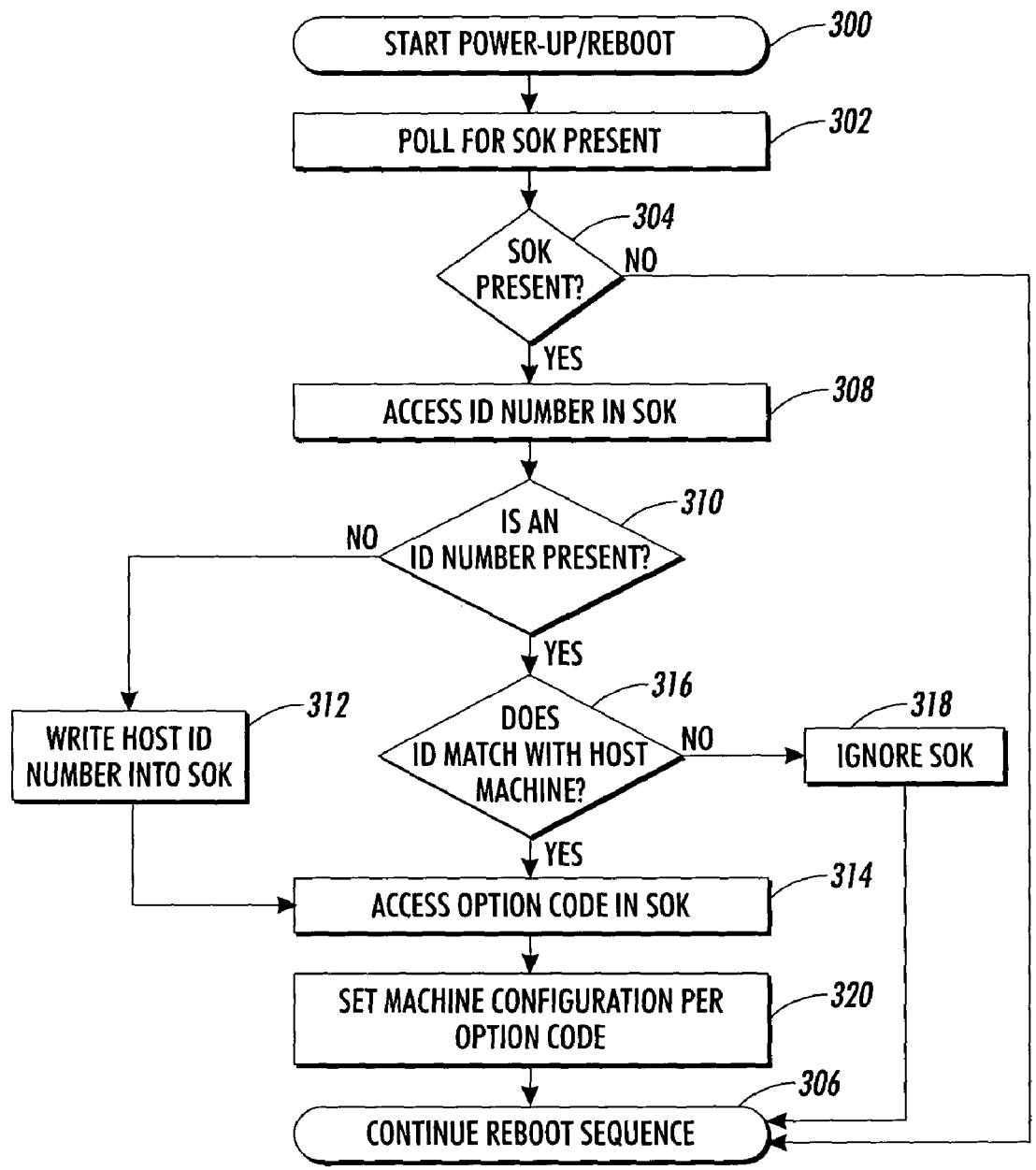
FIG. 3 is a flow chart for a methodology incorporating the software option key into the machine boot-up sequence.

In FIG. 3, shown is a flow chart for a methodology incorporating the software option key into the machine boot-up sequence. Subsequent to when the power supply is switched on or a reset button is hit, the boot sequence 300 is invoked. First a poll 302 is executed to determine if there are one or more SOKs installed. If the determination 304 is made that there are no SOK present then the branch condition is to jump to step 306 and continue the normal reboot sequence. If however, a SOK is found resident access step 308 is made of the address location in the SOK containing the identification number. In a new SOK this one-time programmable serial number region is supplied initially blank. Determination 310 is made of whether there is a identification number or not burned into the NVM of the SOK. If no identification number is present the conditional branch 312 is executed and the unique host machine serial number is written into the SOK. Access 314 is subsequently made of the option code(s) in the SOK. However, if a identification number is found determination 316 is made to compare the identification number to the host machine serial number. If there is no match the 318 instruction is invoked the SOK is ignored, a fault will be logged, and the routine branched to step 306 to continue the normal reboot sequence. As will be understood by one skilled in the art, an alternative embodiment may be to flag the presence of the non-matching SOK as an error to the UI 20, or refuse to complete boot-up until the SOK is removed. In the more typically expected event of a match being found access 314 is made of the SOK to find the prescribed option codes. The machine is then set 320 to a configuration as per the just read in option code. With that complete, the reboot sequence 306 may be continued.

The controller 16 may also be provided with code which continually polls for the swapping of a SOK. In an alternative apparent to one skilled in the art, the controller 16 may respond instead to an interrupt from the swapping of a SOK. In either case upon determination of a swapped, or new SOK, the controller 16 shall poll the SOK and its NVM 22 for indication of option updates or any new system configuration to invoke.

Figure 4:
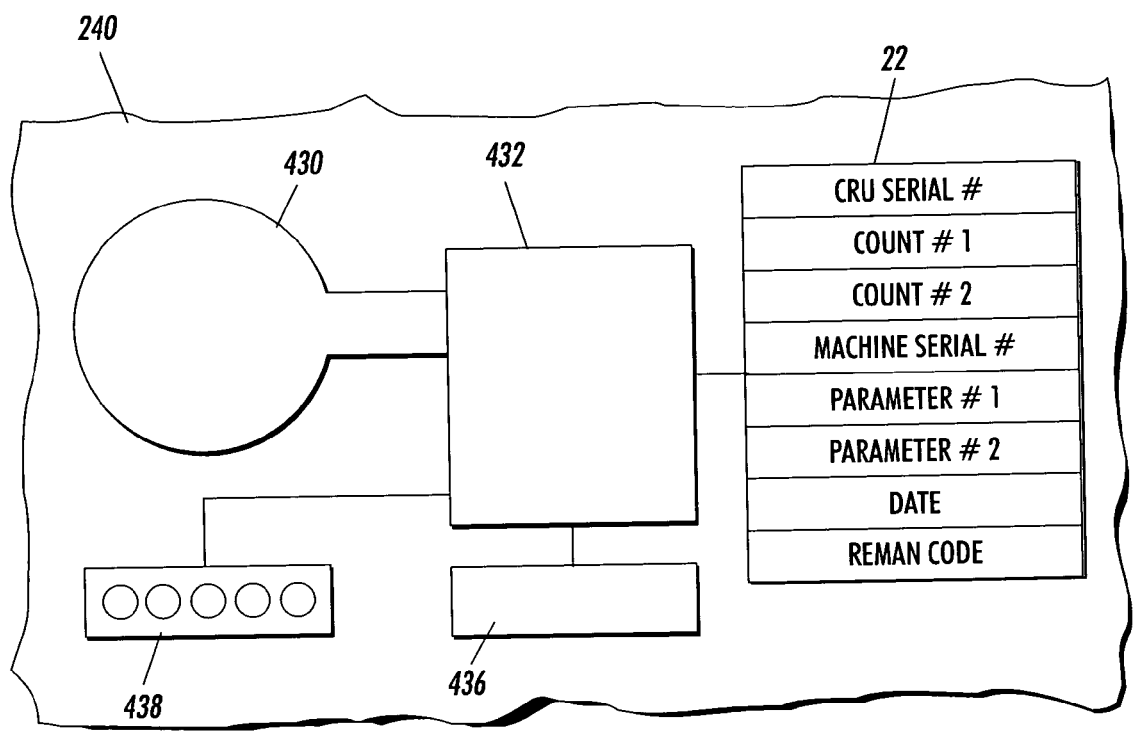
FIG. 4 is a simplified view showing schematically the internals of an example wireless software option key.

FIG. 4 is a simplified view showing the essential elements of a SOK which is operable through wireless means, according to the present invention. The SOK is preferably provided as a badge, plate, or card 240; a portion of which is shown in FIG. 4. In order to operate through wireless means, a SOK requires some sort of wireless interface, such as the RF loop indicated as 430 in FIG. 4 (along with, of course, associated circuitry, the nature of which would be apparent to one of skill in the art), although other wireless interfaces, such as an infrared detector, ultrasound detector, or some other optical coupling, could be provided.

In the particular illustrated embodiment, the RF loop 430, which is sensitive to RF signals of a predetermined frequency, is associated with a chip 432. According to a preferred embodiment of the invention, this chip 432 includes circuitry which acts as an interface between the RF loop 430 and non-volatile memory 22. Of course, in a practical embodiment, the non-volatile memory 22 could be disposed within the chip 432, but is here shown separately for purposes of clarity. In one possible embodiment, the loop 430 can be formed as an etched loop aerial as part of the circuit board forming the SOK. Chip 432 may also have associated therewith a power supply 436, the exact nature of which will depend on a specific design. In order to act as such an interface, chip 432 includes circuitry for recognizing and processing wireless signals of a particular type which may be detected on loop 430. The chip 432 may further be provided with a "hard wire" interface 438, which could be adapted to interact with circuitry within the printer 10.

As can be seen in FIG. 4, the non-volatile memory 22 includes predetermined locations therein for a module serial number, print counts (for the cumulative use of the module and/or a maximum allowed number of prints to be made with the module), re-manufacturing date and option code, including unwritten locations as needed, such as according to the descriptions of SOK functions noted above.

Depending on a particular embodiment of the present invention, the wireless operation of a SOK can work in different ways. In one possible embodiment, the detection of a suitable wireless signal on loop 430 by chip 432 causes the chip 432 to read out all data relating to the SOK which are stored in non-volatile memory 22 at any given time. This data from memory 22 can either be broadcast back through loops 430 by wireless means (if such a transmission means is provided, such as within chip 432) or alternately, can be read out through hard wire interface 438 to, for example, CPU 16. In turn, this information can be a sent from CPU 16 to a user interface 20 and/or sent to a computer over a local area network 18.

Another type of wireless operation of a SOK is to have an initially detected wireless signal cause chip 432 to make memory 22 to enter a "write mode." In other words, the initial wireless contact, such as a wireless signal of a predetermined type, which activates the chip 432 while causing the chip 432 to expect another wireless data stream through loop 430 within a predetermined time frame. This incoming wireless data can then be used to populate specific locations in the memory 22, such as to reset different performance data parameters within the memory. Most specifically, an initial wireless signal could be used to reset the various print counts in the memory to go back to zero or to some other predetermined number. This function would be useful for a re-manufacturing process in which the remanufactured module can once again be used to output a predetermined number of prints. Alternately, wireless means can be used to change or otherwise update other performance data in the memory 22, such as changing parameters for optimal pulse width or transfer efficiency, in view of testing on the module which was performed as part of the re-manufacturing process. Finally, there could also be entered into memory 22 data relating to the date of remanufacture, as well as a special codes relating to what type of actions were taken on the module in the remanufacture in process, for instance, whether or not a photoreceptor drum was replaced or whether a particular ink tank was refilled.

If wireless means are used to change data in memory 22, it may be desirable to recognize that certain data within the memory 22 associated with a particular model should never be changed. For instance, it may be important that the serial number or master print count of the module is never changed, no matter how often the module is remanufactured. Alternately, if some specific re-manufacturing actions are taken on a module, it may be necessary to change only one of the parameters in memory while leaving the various print counts intact. In such cases, it may be desirable to provide a system in which a special "leave unchanged" code is read into a particular location in memory 22, this special code being interpreted by chip 432 as an instruction to leave whenever data is in that particular location in memory 22 unchanged.

Depending on certain considerations, such as cost, or the fact that a SOK system is being retrofit into an existing model of printer, certain data can go in or out of the SOK through loop 430 or alternately through hard wire interface 438. For example, the wireless operation of the various SOK may be on a very simple level, such that the detection of a suitable wireless signal on 430 can simply "unlock" the non-volatile memory 22 for writing therein, although the actual writing to memory 22 may take place through hard wire interface 438. In terms of enabling the present invention, basic principles of wireless controls of electromechanical and electronic devices, such as garage doors and televisions, are well known. The general principles of operating a wireless SOK are readily adapted from these arts in view of the present specification. As described in U.S. Pat. No. 5,675,534 incorporated by reference herein in its entirety for its teaching, it is generally known in the art to provide certain sophisticated security devices, such as involving code hopping encryption, to prevent unauthorized wireless access to a SOK. As shown in FIG. 4, the chip 432 may have provided therein an encryption key which will have the effect of permitting only those users having the encryption key to access the SOK by wireless means. This feature is very useful for preventing unauthorized tampering with data in memory 22, such as to alter the print counts. While the use of systems such as code hopping encryption are known in the "security" context of locking automobiles and a garage door openers, it is believed to be novel to use this system in the context of preventing access to memory associated with replaceable modules in office equipment.

Figure 5:
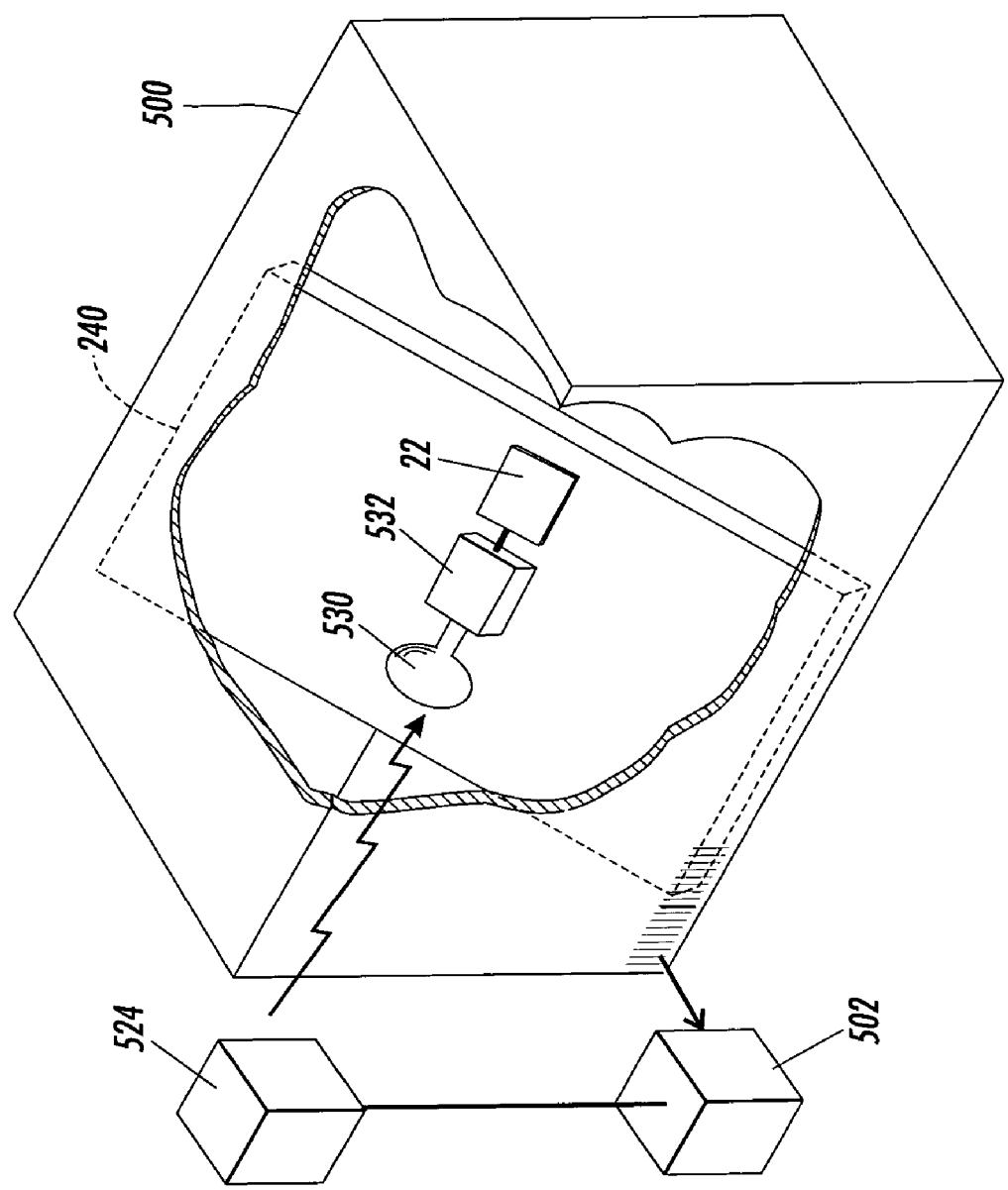
FIG. 5 is a simplified view showing a replaceable wireless software option key disposed within a package and being processed within a system.

One key advantage of wireless communication with a SOK, particularly Infrared or RF communication, is that in the wireless signals can pass through many types of packaging, and thus a SOK can be operated even while the module to which they are associated is packaged. FIG. 5 is a simplified view showing how a SOK such as 240 disposed within a signal-transmissive (for instance, cardboard) package 500 can be accessed and operated by wireless means. A device 524, which emits the suitable RF or infrared radiation, can be used to write relevant data into memory 22 of the SOK 240. Such data may be of a time sensitive variety, such as the date a particular package module is mailed to an end user: in such a case, it may be desirable to have the module itself prepackaged and write the date of mailing to memory 22 just as the package 500 is going out the door. In particular machine option codes may be provided consonant with the target customers request for a given machine configuration upgrade. Similarly, special codes can be read into memory 22 representing, for example, the identity of the end user intended to receive the module in the mail, or a particular service contract number under which the packaged module is sent. Because of the wireless nature of writing into memory 22, a supply of modules, already in packages 500, can be retained in a warehouse and written into with relevant information only as they are sent to end users.

Another possibility is to package different SOK 240, and have a bar code reader, such as 502, or equivalent device, read markings on the package 500, and then cause a device 524 to write data relating to the bar code data into memory 22 by wireless means. For example, the bar code reader 502 could read a bar code on the outer surface of package 500 representative of the addressee of the package, and cause device 524 to write a code identifying the address into memory 22.

Alternately, as the SOK is capable of broadcasting back information and memory 22 by wireless means as well, the particular SOK 240 within package 500 could be queried by wireless means just as it is being sent to a user, and this information recorded, so that a vendor could know exactly which SOK, identified by serial number, were sent to what addressee on any particular day. Another possibility is to determine the serial number of a module within a package 500 by wireless means, and then have a bar code writer print a code relating to the serial number on a label to be attached to the package 500. Another feature enabled by the use of wireless communication would be the use of one transmitter/receiver within the machine being able to communicate with multiple SOK used within the machine. This would provide a cost saving, as multiple harnesses for each device would not be needed.

In closing, by employing software option key in combination with a one time programmable serial number region that is initially provided as left in it's original un-programmed state (also referred to as being blank of data), provides robust secure option/configuration management with a minimum of impact to the manufacturing and field service organizations.

While the embodiments disclosed herein are preferred, it will be appreciated from this teaching that various alternative modifications, variations or improvements therein may be made by those skilled in the art. For example, it will be understood by those skilled in the art that the teachings provided herein may be applicable to many types of machines and systems employing controllers and software option keys, including copiers, printers and multifunction scan/print/copy/fax machines or other printing apparatus alone or in combination with computer, fax, local area network and internet connection capability. All such variants are intended to be encompassed by the following claims:

The invention claimed is:

1. A method for managing machine operation options and configuration comprising:
   providing a software operation key separable from the machine, the software operation key further comprising a wireless interface, a memory, the memory further comprising a programmable serial region and an option code;
   placing the software operation key into the machine;
   reading via the wireless interface the programmable serial region of the memory and if found blank, initializing with a machine identification number;
   comparing the content of the programmable serial region if not blank with the machine identification number;
   reading the memory via the wireless interface and placing the option code into the machine; and,
   operating the machine in accordance with the option code.

2. The method of claim 1 wherein the machine is a printing apparatus.

3. The method of claim 1 wherein the machine is a multi-function office device.

4. The method of claim 1 wherein the memory is a non-volatile type of memory.

5. The method of claim 1 wherein the software operation key is a CRUM.

6. The method of claim 1 wherein the machine identification number is the machine serial number.

7. A printing machine comprising:
   a software operations key separable from the machine, further comprising a wireless interface and a memory, the memory having at least an option code region, and a one time programmable serial region;
   an option code written into the option code region of the memory suitable for directing the printing machine to operate in a particular configuration; and,
   a control system to access the one time programmable serial region of the memory via the wireless interface to find if the one time programmable serial region is either initially blank or as containing an identification number and determine thereby if the option code in the option code region of the software operations key should be used to configure the printing machine.

8. The printing machine of claim 7 wherein the memory is non-volatile memory.

9. The printing machine of claim 8 wherein the non-volatile memory is an EEPROM.

10. The printing machine of claim 8 wherein the non-volatile memory is a CRUM.

11. The printing machine of claim 7 wherein the option code directs the printing machine to configure as a scanner.

12. The printing machine of claim 11 wherein the option code directs the printing machine to configure with a scan to email mode.

13. The printing machine of claim 11 wherein the option code directs the printing machine to configure with a scan to internet fax mode.

14. The printing machine of claim 7 wherein the option code directs the printing machine to configure for faster operation.

15. The printing machine of claim 7 wherein the option code directs the printing machine to configure for job based accounting.

16. A software operations key for setting the option configuration of a machine and separable from that machine, comprising:
   a wireless interface,
   a memory, the memory having at least:
      an option code region, and
      a one time programmable serial region provided as initially blank for writing a machine identifier of that first machine into which the software operations key is installed—find if the one time programmable serial region is either initially blank or as containing an identification number; and,
   an option code written into the option code region of the memory suitable when accessed via the wireless interface, for directing the machine to operate in a particular configuration.

17. The software operations key of claim 16 wherein the memory is an EEPROM.

18. The software operations key of claim 16 wherein the memory is a CRUM.

19. The software operations key of claim 16 wherein the machine identifier is the machine serial number.

* * * * *